US006904967B2

(12) United States Patent
McLaughlin

(10) Patent No.: US 6,904,967 B2
(45) Date of Patent: Jun. 14, 2005

(54) METHOD AND SYSTEM FOR STORM WATER SYSTEM HEAT EXCHANGE

(76) Inventor: Melvin D. McLaughlin, 3108 Howard Park Ave., Baltimore, MD (US) 21207

( * ) Notice: Subject to any disclaimer, the term of this patent is extended or adjusted under 35 U.S.C. 154(b) by 0 days.

(21) Appl. No.: 10/186,754

(22) Filed: Jul. 2, 2002

(65) Prior Publication Data

US 2003/0015317 A1 Jan. 23, 2003

Related U.S. Application Data

(62) Division of application No. 09/352,761, filed on Jul. 14, 1999, now Pat. No. 6,412,550.
(60) Provisional application No. 60/108,890, filed on Nov. 17, 1998.

(51) Int. Cl.[7] ............................................. F25B 29/00
(52) U.S. Cl. .................. 165/201; 165/48.1; 165/45; 165/47; 165/254; 165/257; 62/238.7
(58) Field of Search ..................... 165/45, 48.1, 201, 165/236, 47, 254, 257, 288, 299; 62/238.6, 238.7, 260; 60/641.2

(56) References Cited

U.S. PATENT DOCUMENTS

| | | | | |
|---|---|---|---|---|
| 2,689,090 A | * | 9/1954 | Wetherbee et al. | ....... 165/45 X |
| 3,521,699 A | * | 7/1970 | Van Huisen | ............... 165/45 X |
| 3,658,123 A | * | 4/1972 | Root | ........................ 165/45 X |
| 4,008,709 A | * | 2/1977 | Jardine | ..................... 165/45 X |
| 4,119,086 A | * | 10/1978 | Brussels | |
| 4,158,291 A | * | 6/1979 | Jones | |
| 4,201,189 A | * | 5/1980 | Saunders | |
| 4,353,412 A | * | 10/1982 | Krumhansl | ............. 165/257 X |
| 4,375,831 A | * | 3/1983 | Downing, Jr. | ............. 165/48.1 |
| 4,378,908 A | * | 4/1983 | Wood | ..................... 62/238.6 X |
| 4,476,921 A | * | 10/1984 | Stubbolo | .................... 165/48.1 |
| 4,517,958 A | * | 5/1985 | Worf | ..................... 165/48.1 X |
| 4,577,679 A | * | 3/1986 | Hibshman | ............... 165/236 X |
| 5,183,100 A | * | 2/1993 | Harrell, Jr. | .................... 165/45 |
| 5,207,075 A | * | 5/1993 | Gundlach | ................. 62/260 X |
| 5,261,251 A | * | 11/1993 | Galiyano | ............... 62/238.7 X |
| 5,383,337 A | * | 1/1995 | Baker | ........................ 165/45 X |
| 5,477,703 A | * | 12/1995 | Hanchar et al. | .............. 62/260 |
| 5,671,608 A | * | 9/1997 | Wiggs et al. | ............. 165/45 X |
| 5,738,164 A | * | 4/1998 | Hildebrand | .................. 165/45 |
| 5,908,008 A | * | 6/1999 | Sensabaugh | |
| 5,975,192 A | * | 11/1999 | Moratalla et al. | ....... 165/288 X |
| 6,450,247 B1 | * | 9/2002 | Raff | ............................ 165/45 |
| 6,484,794 B1 | * | 11/2002 | Schulak et al. | ............... 165/45 |
| 6,615,601 B1 | * | 9/2003 | Wiggs | ...................... 62/260 X |

FOREIGN PATENT DOCUMENTS

DE            31 49 636 A1  *  7/1983  ................... 165/45

* cited by examiner

Primary Examiner—Ljiljana Ciric
(74) Attorney, Agent, or Firm—George T. Marcou; Kilpatrick Stockton LLP

(57) ABSTRACT

A system and method for structure heating, ventilation, and air conditioning (HVAC) that uses a heat exchanger to transfer heat between the structure and a subsurface storm water discharge chamber system is disclosed. Coils for heat management exchange are located in permanently collected runoff within a storm water management system beneath the frost line; the use of coils located within the retained runoff allows for improved heat exchange over coils placed within soil. Also described are a sensing device and feedback loop for HVAC control, to improve efficiency at ambient temperatures near the subsurface temperature.

9 Claims, 5 Drawing Sheets

METHOD AND SYSTEM FOR STORM WATER SYSTEM HEAT EXCHANGE

CROSS-REFERENCE TO RELATED APPLICATIONS

This application is a Divisional application of U.S. patent application Ser. No. 09/352,761, filed on Jul. 14, 1999, now U.S. Patent No. 6,412,550B1, and claims priority to provisional application, Ser. No. 60/108,890, filed Nov. 17, 1998, both incorporated herein by reference.

FIELD OF THE INVENTION

The present invention relates to use of a storm water system for heat exchange and more particularly to a method and system for using an underground storm water system for heat exchange for building heating, ventilation, and air conditioning (HVAC).

BACKGROUND

Many buildings and other structures for which heating or cooling is needed provide temperature control using a closed loop system having a heat exchanger. A heat exchanger requires for operation a source for adding or removing heat from the structure. A common source for adding or removing heat that is known in the art involves capture of geothermal energy, which is the energy from the earth or temperature from the earth, using a heat exchanger.

The operation of a heat exchanger can be understood by reference to the radiator of a car, which is one form of heat exchanger. In a car, heat from the engine is transferred to coolant circulated within the engine. The coolant is then pumped into a radiator, where heat is transferred to the surrounding air, and the cooled coolant is returned to the engine to begin the cycle again. In this manner, heat is transferred from the engine so as to maintain the temperature of the engine below the boiling point.

A similar approach is used to cool a structure, such as a building. A heat exchanger connected to a building takes advantage of the temperature difference between the ambient or surface air temperature and a constant temperature source, such as relatively constant subsurface temperature (subsurface temperature, as used herein, refers to the temperature at a depth of several feet below the surface of the earth, the depth of which depends on the climate and other conditions of the area; below this set depth, the temperature is known to generally remain constant). The heat exchanger is used to transfer the temperature difference from the subsurface area to the building located on the surface. Because the subsurface temperature is typically above the surface temperature in Winter, heat may be transferred to the structure via the heat exchanger to heat the structure, and because the subsurface temperature is typically less than the surface temperature during the Summer, the heat exchanger can transfer the heat in the building from the surface to the subsurface to cool the structure.

The relatively constant subsurface temperature of the earth is commonly considered when laying water pipes or sewer pipes, as well as when building a structure. In these cases, it is often important that the pipes or structure be located below the frost line—the area within the ground below which water freezes. Ground below the frost line has a typically somewhat higher temperature than the ambient air temperature at the surface in Winter, and typically somewhat lower temperature than the ambient air temperature at the surface in Summer.

It is known in the art to provide this heat exchange by digging an excavation, referred to as a field, for the structure, planting a closed loop heat exchanger in the earth for capturing or releasing heat. A problem with this approach is that the heat transfer coefficient between the coolant contained in the closed loop of the heat exchanger and the solid of the soil in which the loop is located is substantially less than the heat transfer coefficient for liquid-to-liquid or liquid to gas heat transfer. As a result, heat transfer using soil results in inefficiency compared to heat transfer using a liquid or gas.

For a completely unrelated reason to heat transfer, it is also known in the art to provide subsurface storage of storm water for businesses and other developments, such as parking lots. These systems are referred to as underground storm water chamber systems. Subsurface storage can include storage tanks specially designed and constructed for these facilities, and storm water is also storable in above-ground constructs, such as surface ponds or impoundments.

Underground storm water chamber systems can be either detention systems, retention systems, or first flush attenuation systems. Detention systems store a calculated volume of storm water in the chamber. Water is released at a predetermined rate to an outflow structure. Retention systems also store a calculated volume of storm water in the chamber; however, the primary drainage mechanism in retention systems is infiltration into the soil. First flush attenuation systems are similar to retention systems; however, they have limited capacity. Once capacity has been met, excess storm water is released into an outlet. First flush attenuation systems are often used to take advantage of the soil's filtration and renovation capabilities when the inital runoff contains a high percentage of pollutants. The present invention can be used in conjunction with any form of underground storm water chamber system.

A storm water management system is designed for managing the discharge of water from new construction so that the volume of water that leaves the site is no greater that the volume before the construction began. For example, if the site was a meadow with trees and grass, typical runoff levels would be relatively small, such as ten percent of the rainfall, with ninety per cent of the rainfall being absorbed into the ground. After construction on such a site, however, runoff may be much greater than it was when the site was a meadow.

Whenever new construction occurs or there are other improvement to property, in general, a calculation must be made to ensure that sufficient runoff storage capacity for the geographical area is provided, such that the base line of rainfall that is anticipated in the area from historical data is maintained. The calculations for storage capacity are predicated on the historical rainfall information, so that the storage capacity of the storm water management system will have the capacity to contain the predicted amount of runoff that can be expected with the new construction or other improvement, and this capacity maintained and metered out at the same rate of discharge that was occurring before the construction.

This discharge from the storm water system typically is made to a storm drain, which most municipalities and incorporated townships have installed to keep water or storm water from collecting on the surface. In more rural areas, this discharge may typically occur onto neighboring property or into open swales or ditches along roadways. Municipal systems that combine both sanitary and storm water systems typically further include backflow preventors installed from the storm water management system, such that no sanitary effluent can back up into the system.

In order to accomplish the runoff collection and discharge needed, a typical storm water collection system collects runoff as quickly as possible. For example, the system might include a thirty-six-inch pipe leading into the storm water management collection area to allow for significant inflow of runoff. The same system might also have only a four-inch diameter exit pipe to control the discharge. As a result, during a rainfall event, the system typically becomes inundated with runoff, which is then discharged at a lower flow rate through the exit pipe. Thus, the net effect of collected rainfall on the property during a rainfall event is that downstream receivers of the discharge receive the same amount of water, which is metered out over time, as was received prior to the new construction or other improvement.

Typical storm water management systems are further designed such that no runoff or only a small amount of runoff normally remains in the system. In these systems, the small amount of runoff typically remains in the system solely for water quality management purposes. These water quality management purposes, which are also unrelated to heat exchange, are generally mandated by the local water quality control authority, requiring that the quality of the water discharged from the storm water management system be of the same quality as the rain water.

It is also known in the art to provide underground storage using prefabricated units that are interlockable. An example of such prefabricated units is the MAXIMIZER CHAMBER SYSTEM storm water treatment device made by Infiltrator Systems Inc. of Old Saybrook, Conn. In this system, rows of individually prefabricated chambers are interlocked to form a continuous storage space that is structurally tested to withstand high surface pressures, as from vehicles parked above the system.

Because underground storm water chamber systems are typically located below the frost line, any water within these systems will reach an equilibrium temperature regardless of the seasonal air temperature at the surface above the system: For the same reasons as described above, this equilibrium temperature is typically below the surface air temperature during Summer and above the surface air temperature during Winter.

There is a need for a method and system for utilizing the intrinsic heat properties of water stored in a storm water chamber system for operation in conjunction with conventional HVAC systems of structures, such as buildings or other facilities, located near the storm water chamber system to provide efficient heating and cooling of these structures. There is a further need to utilize a liquid-to-liquid or liquid-to-gas heat exchange for heating and cooling such facilities in conjunction with use of a storm water chamber system.

SUMMARY OF THE INVENTION

It is an advantage of the present invention to solve the problems of the prior art by utilizing existing excavation made for other purposes to provide a location for a heat exchanger for a structure.

It is a further advantage of the present invention to provide a method and system for utilizing the energy of water stored in a storm water chamber system for operation with conventional HVAC systems of buildings or other facilities located near the storm water chamber system to heat and cool these facilities.

It is a further advantage of the present invention to provide for a heat exchange system locatable within prefabricated storm water chamber chambers. It is a further advantage of the present invention to provide for an interlockable heat exchange system that is interlockable with units of a storm water chamber system.

It is a further advantage of the present invention to provide for a method and system for retaining a minimum volume of water within a storm water chamber system having a heat exchange element, such that the heat exchange element remains immersed within retained runoff in the system.

It is a further advantage of the present invention to provide for a method and system for feeding back information from the storm water chamber system to the heat exchange portion of an HVAC system of a building or other facility to increase the efficiency of the system.

An embodiment of the present invention utilizes the excavation for a storm water management system to provide a source for capture of geothermal energy. This embodiment thereby uses a liquid-to-liquid or liquid-to-gas transfer ratio because the coil containing the liquid or gas medium of the heat exchanger is immersed in the liquid runoff that is contained within the storm water management system.

An embodiment of the present invention includes a closed loop heat exchanger system having connections by, for example, pipes containing a fluid or gas heat exchanger medium, and other components. The components of this embodiment include a pair of heat exchanger portions connected by a loop, and a pump that serves as a circulator for the heat exchange medium. In an embodiment of the present invention, the circulator moves the medium between an above ground heat exchanger, such as a radiator, for example, located in a building, and a below ground heat exchanger that includes coils located within a storm water chamber system. An embodiment of the present invention further includes a sensing device, such as a thermocouple, and feedback loop for HVAC control, to improve efficiency at ambient temperatures near the subsurface temperature.

Additional objects, advantages and novel features of the invention will be set forth in part in the description that follows, and in part will become more apparent to those skilled in the art upon examination of the following or upon learning by practice of the invention.

DETAILED DESCRIPTION

Figure 1:
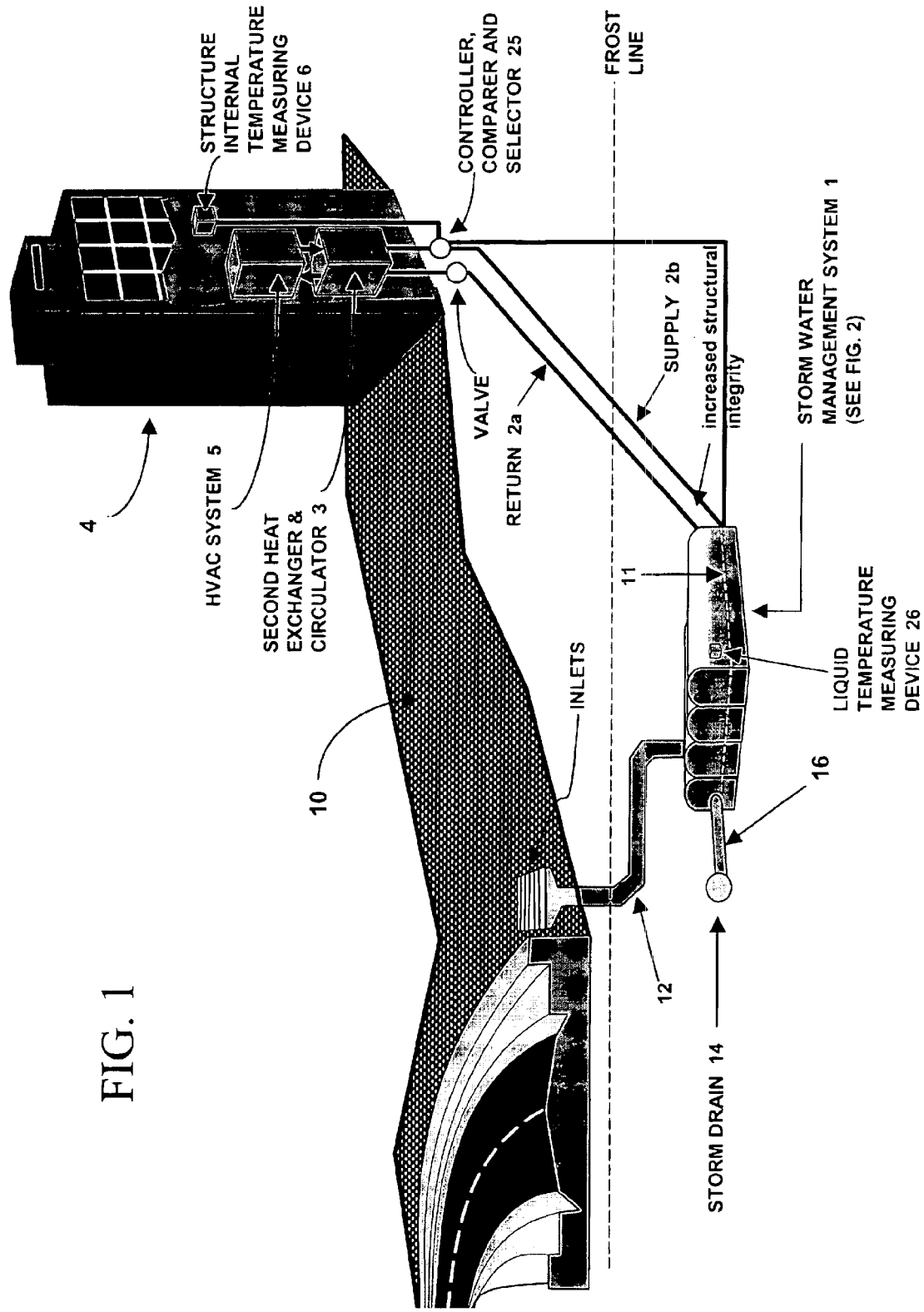
FIG. 1 depicts a perspective view of an example underground storm water system heat exchange and HVAC system according to an embodiment of the present invention.
Figure 2:
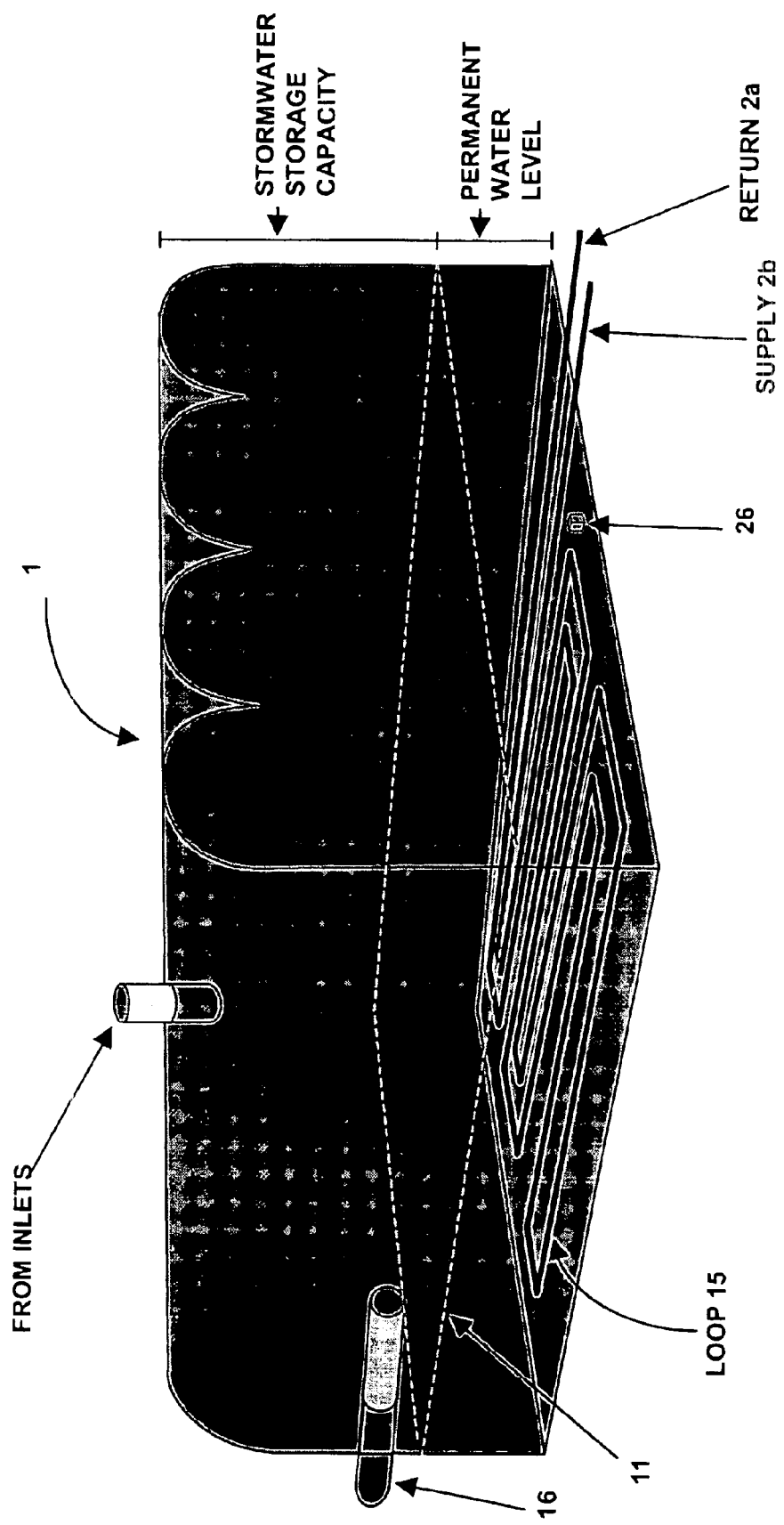
FIG. 2 shows a closeup perspective view of the storm water system heat exchange component of an embodiment of the present invention.

FIGS. 1 and 2 illustrate an embodiment of the present invention that includes a closed loop heat exchanger system 1, 2a, 2b, 15 having connections by, for example pipes containing a fluid or gas heat exchanger medium, and other components. The components of this embodiment include a pair of heat exchangers portions 3, 15 connected by a loop 2a, 2b, and a pump 3 that serves as a circulator for the heat exchange medium. In an embodiment of the present invention, the circulator 3 moves the medium between an above ground heat exchanger 3, such as a radiator, for example, located in a building 4, and a below ground heat exchanger 15 that includes coils located within a storm water chamber system 1. The storm water chamber system 1 maintains a continuous level of contained runoff 11. An embodiment of the present invention further includes a storm water chamber system temperature sensing device 26, a structure internal temperature sensing device 6, which may include, for example, a thermocouple, and feedback loop for HVAC control 5 to improve efficiency at ambient temperatures near subsurface temperature.

Figure 5:
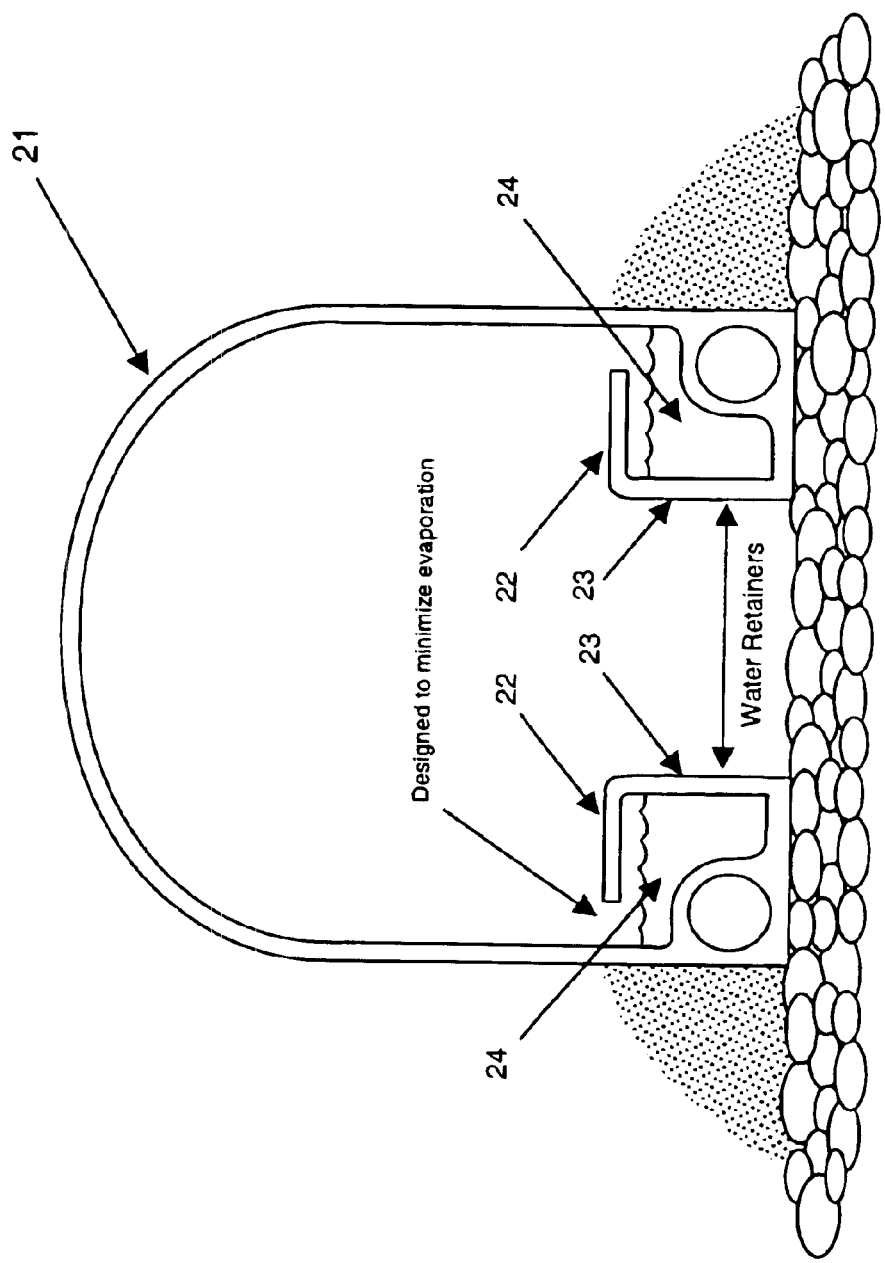
FIG. 5 shows a closeup perspective view of one configuration of the storm water heat exchange component of an embodiment of the present invention.

When the base is pourous, it is more difficult to maintain a continuous level of runoff between rains. FIG. 5 shows one embodiment of the present invention designed to capture runoff water 24 when the base is unable to sufficiently retain a proper water level. Retaining walls 23 capture and hold runoff water 24 when the water level rises above the retaining walls 23. When the water level falls back down due to the porous base, the captured runoff water 24 can still be used to increase the efficiency of heat transfer. To minimize evaporation, water retainer tops 22 are used to cover the captured runoff water 24. This embodiment can also be used as additional reservoirs for pollutants to collect.

As discussed above, typical existing unit-type storm water chamber systems are expandable and combinable. The units come in easily transportable sections that are attachable together and may be assembled in the field, after excavation is completed. In accordance with an embodiment of the present invention, coil capacity for a heat exchanger is integrated into these units, such that the portions of the heat exchanger system may be similarly sectioned together.

In an embodiment of present invention, a coil, which is embedded into the system, is molded into the units of the system when made, and certain fittings that allow the flexibility to terminate and to create loop conditions are included, such that the system may be expanded to the size needed for the storm water management system. For example, to increase the size of the system, a combination of fittings is used that allows the system to be made longer, shorter, or wider, in whatever configuration that is needed.

In another embodiment of the present invention, the coil is woven throughout the bottom of the storm water chambers providing increase structural integrity by resisting spreading at the bottom of the storm water chambers when extreme pressures are applied such as that caused by an automobile parking above a storm water chamber. Additionally, the coil must be configured to prevent crimping when extreme pressures are placed on the tubing.

Figure 3A:
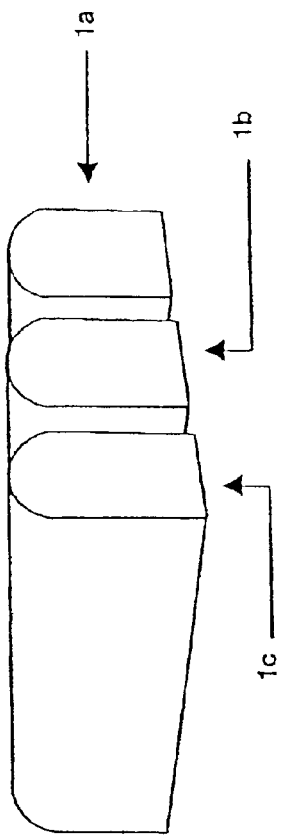
FIGS. 3A and 3B present perspective views of two different configurations of connected units of the storm water heat exchange component of an embodiment of the present invention.
Figure 3B:
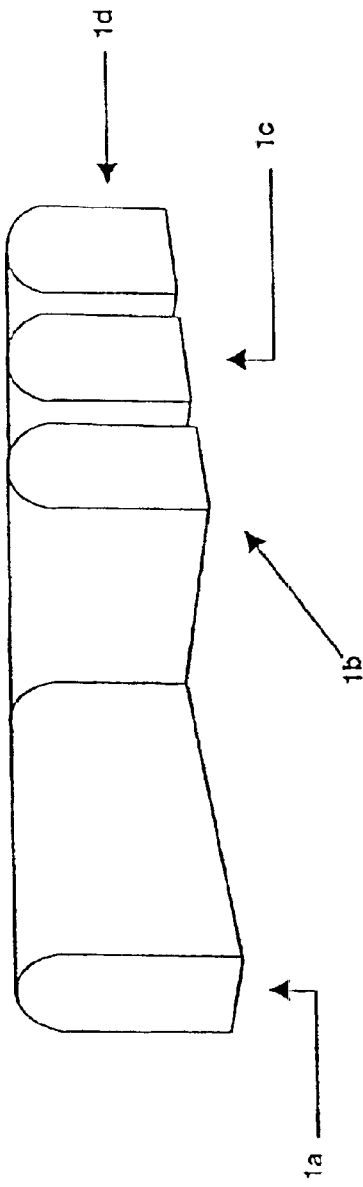

Two configurations of connected units according to this embodiment are shown in FIGS. 3A and 3B. In FIG. 3A, units 1a, 1b, 1c are connected lengthwise to provide a storm water management system heat exchanger component that has a rectangular shape, as viewed from overhead. In FIG. 3B, the units 1a, 1b, 1c, 1d are arranged so as to form a generally L-shaped storm water management system heat exchanger component, as viewed from overhead. Such a system can also include loops on the ends that are orientable in a left-handed or right-handed direction, and ultimately leadable to a location where a supply line and a return line are attached.

In an embodiment of the present invention, rather than discharging from the bottom or the lowest point of the storm water management system, as is typical in the prior art, runoff is discharged at a predetermined level, such that a permanent volume of runoff is maintained in the system. For example, an embodiment of the present invention may include six feet of water permanently maintained in the bottom of the storm water management system. In this embodiment, the coil of the heat exchanger is located at the bottom of the maintained water level, which allows the achievement of a higher transfer rate from the subsurface portion of the heat exchanger system than would occur if the heat exchanger used soil for the heat transfer.

As shown in FIG. 1, the system of an embodiment of the present invention includes units 1 made of a plastic material that are premolded, joinable, and have sufficient strength to withstand vehicles and other pressures from parking lots or other construction placed above the system. In a typical use of these units, they are connected to one another in a manner prescribed by the manufacturer such that the system as a whole stores storm water in a fashion that is consistent with the laws of the natural resources management authority, as described above.

In FIG. 1, a heat exchange system (shown in FIG. 2) within a storm water management system 1, having an inlet 12 and a storm drain outlet 16, is connected by a return line 2a and a supply line 2b to a heat exchanger and circulator unit 3 within a structure 4, such as a building. The circulator unit 3, which is located in the structure 4, operates in conjunction with the structure HVAC system 5.

In an embodiment of the present invention, runoff from the surface 10 collects via the inlet 12 in the storm water management system 1. The collected runoff in turn is released from the storm water management system 1 to the storm drain 14, by, for example, reaching a level 11 above the height of the storm drain outlet 16 for the storm drain 14. In an embodiment of the present invention, a predetermined volume of liquid form the collected runoff remains within the storm water management system at this level 11.

FIG. 2 shows a closeup view of the subsurface storm water system heat exchange component of an embodiment of the present invention. In FIG. 2, the permanent water level 11 is presented on the scale located on the right hand side of the figure, and the dotted line depicts the permanent water level 11 within the system 1 for an embodiment of the present invention. Also shown is the loop of the heat exchanger 15, which is located below the permanent water line 11 retained within the system 1.

As shown in FIG. 2, an embodiment of the present invention further includes a storm water chamber system temperature sensing device 26 located within the storm water management loop that feeds information back to the energy management system in the building or other structure, such that optimal or otherwise more beneficial times for operating the circulator for the heat exchanger may be determined.

For example, at certain times, it may be determined that the ambient air temperature is close to the temperature that is to be maintained inside the structure. In this situation, the cost to circulate the circulator could exceed the benefits of the relatively small fraction of temperature difference between the retained water and the surface ambient temperature. The storm water chamber system temperature sensing device 26 is employed to feed back monitoring information to any energy management portion of the system so that the system only attempts to capture energy when it was suitable to do so.

Figure 4:
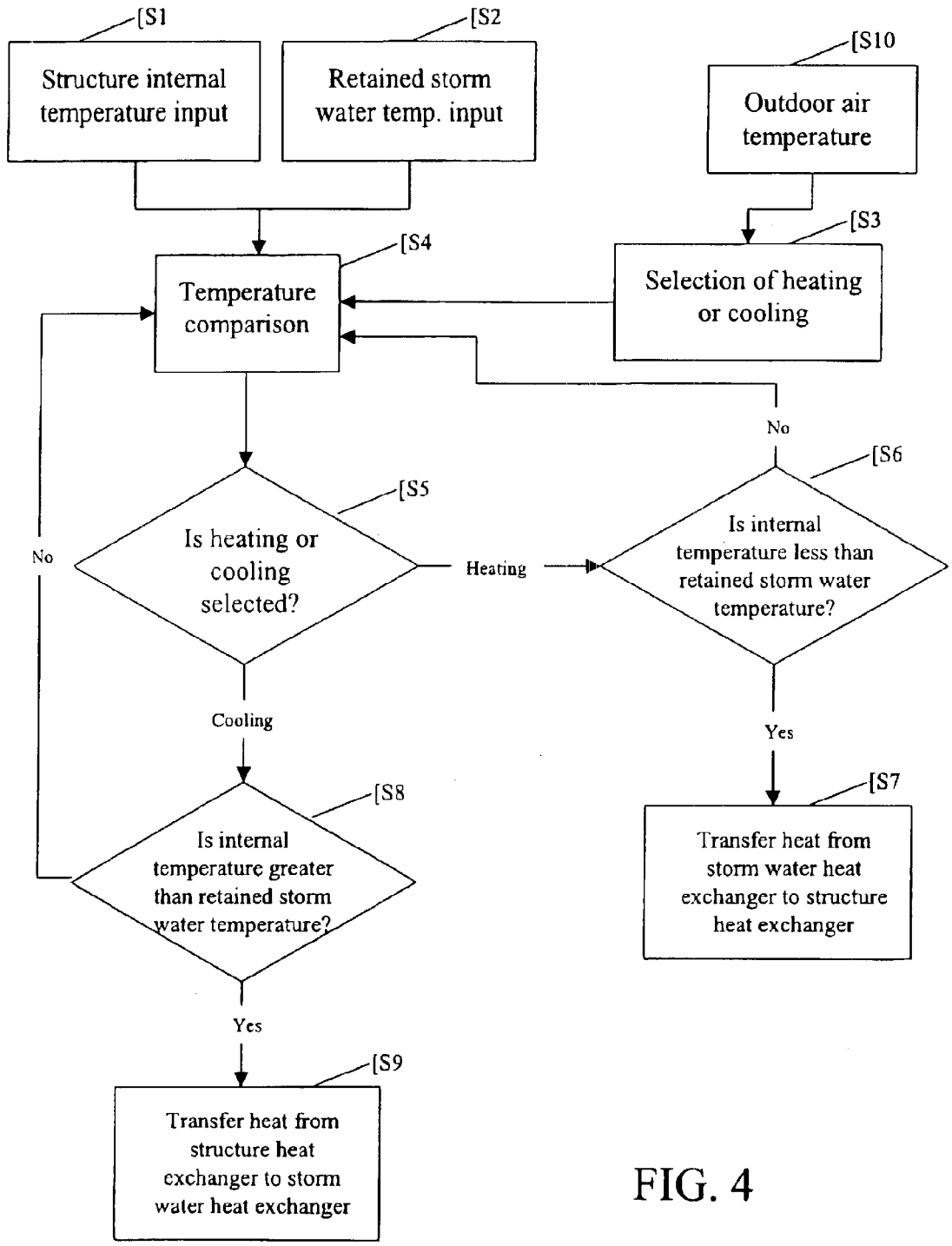
FIG. 4 presents a flow diagram of the storm water heat exchanger process of an embodiment of the present invention.

FIG. 4 presents a flow diagram of the heating and cooling operation of the heat exchange system in accordance with an embodiment of the present invention. As shown in FIG. 4, in step S1, a structure internal temperature input is received. In step S2, a retained storm water temperature input is received. In step S3, a selection of heating or cooling is made. In step S4, a temperature comparison is made between the structure internal temperature input and the retained storm water temperature input.

In step S5, it is determined whether a selection for heating or cooling has been made. If heating is selected in step S5, the system proceeds to step S6. In step S6, a determination is made as to whether the internal temperature is less than the retained storm water temperature. If no in step S6, the system returns to step S4 for temperature comparison. If yes in step S6, heat is transferred from the storm water system heat exchanger to the structure heat exchanger, so that the structure is heated.

In step S5, if cooling is selected, the system proceeds to step S8. In step S8, a determination is made as to whether the internal temperature is greater than the retained storm water temperature. If no in step S8, the system returns to step S4 for temperature comparison. If yes in step S8, heat is transferred from the structure heat exchanger to the storm water system heat exchanger, so that the structure is cooled.

In one embodiment of the present invention, in step S3, a selection of heating or cooling is made based on the outdoor air temperature. If the outdoor air temperature is cooler than the internal temperature and cooling is desired, it is unnecessary to activate the primary cooling system. Conversely, if the outdoor air temperature is warmer than the internal temperature and heating is desired, it is unnecessary to active the primary heating system.

Embodiments of the present invention have now been described in fulfillment of the above objects. It will be appreciated that these examples are merely illustrative of the invention. Many variations and modifications will be apparent to those skilled in the art.

I claim:

1. A method for providing heat conduction for a structure using a storm water management system located below a frost line, the structure having a structure internal temperature, the storm water management system is prefabricated to contain a first heat exchanger and retain a liquid run-off, wherein the first heat exchanger is immersed in the liquid run-off, the liquid run-off having a liquid run-off temperature; a connecting line connected to the first heat exchanger; and a second heat exchanger connected to the connecting line, the second heat exchanger conducting heat directly with the structure, the method comprising:

determining the structure internal temperature;

determining the outdoor air temperature;

determining the liquid run-off temperature;

making a selection from the group consisting of heating and cooling, wherein the selection is substantially based on the outdoor air temperature;

comparing the liquid run-off temperature to the structure internal temperature; and determining whether to transfer heat between the second heat exchanger and the first heat exchanger that is contained in the prefabricated storm water management system.

2. The method of claim 1, further comprising:

if the liquid run-off temperature is less than the structure internal temperature and the selection is cooling, transferring heat from the second heat exchanger to the first heat exchanger.

3. The method of claim 1, further comprising:

if the liquid run-off temperature is greater than the structure internal temperature and the selection is heating, transferring heat from the first heat exchanger to the second heat exchanger.

4. The method of claim 1, wherein the storm water management system further comprises a storm water chamber system temperature sensing device, and wherein determining the liquid run-off temperature comprises receiving data from the storm water chamber system temperature sensing device.

5. The method of claim 4, wherein the storm water chamber system temperature sensing device comprises a thermocouple.

6. The method of claim 1, wherein the structure further comprises a structure internal temperature sensing device, and wherein determining the structure internal temperature comprises receiving data form the structure internal temperature sensing device.

7. The method of claim 1, wherein the selection is received from a user.

8. The method of claim 1, wherein the first heat exchanger provides increased structural integrity to the prefabricated storm water management system.

9. A method for providing heat conduction for a structure using a storm water management system located below a frost line, the storm water management system containing a first heat exchanger and retaining a liquid run-off, wherein the first heat exchanger is immersed in the liquid run-off, the liquid run-off having a liquid run-off temperature; a connecting line connected to the first heat exchanger; and a second heat exchanger connected to the connecting line, the second heat exchanger conducting heat directly with the structure, the method comprising:

determining the outdoor air temperature;

making a selection from the group consisting of heating and cooling, wherein the selection is substantially based on the outdoor air temperature;

if the selection is heating, transferring heat from the first heat exchanger to the second heat exchanger, such that the structure is heated; and if the selection is cooling, transferring heat from the second heat exchanger to the first heat exchanger, such that the structure is cooled.

\* \* \* \* \*